United States Patent [19]
Dembeck et al.

[11] Patent Number: 5,739,933
[45] Date of Patent: Apr. 14, 1998

[54] OPTICALLY CONTROLLED OPTICAL SWITCHING MODULE, METHOD OF OPTICALLY CONTROLLING AN OPTICAL SWITCHING NETWORK, AND OPTICAL SWITCHING NETWORK

[75] Inventors: Lars Dembeck, Stuttgart; Jörg Schmitz, Bergisch-Gladbach; Eugen Lach, Marbach, all of Germany

[73] Assignee: Alcatel N.V., Rijswijk, Netherlands

[21] Appl. No.: 653,539

[22] Filed: May 28, 1996

[30] Foreign Application Priority Data

Jun. 2, 1995 [DE] Germany .................. 195 19 735.6

[51] Int. Cl.⁶ .................................................. H04J 14/08
[52] U.S. Cl. ................................... 359/117; 359/139
[58] Field of Search ................................ 359/117, 128, 359/139, 158, 176, 179

[56] References Cited

U.S. PATENT DOCUMENTS

| | | | |
|---|---|---|---|
| 4,176,401 | 11/1979 | Lonberger | 364/900 |
| 4,234,968 | 11/1980 | Singh | 455/607 |
| 4,894,818 | 1/1990 | Fujioka et al. | 370/3 |
| 4,991,975 | 2/1991 | Alferness et al. | 359/139 |
| 5,303,077 | 4/1994 | Böttle et al. | 359/123 |
| 5,488,501 | 1/1996 | Barnsley | 359/137 |
| 5,550,939 | 8/1996 | Rodgers et al. | 385/14 |

FOREIGN PATENT DOCUMENTS

| | | |
|---|---|---|
| 550046 | 7/1993 | European Pat. Off. ........ 359/117 |
| 4108213 | 9/1992 | Germany . |
| 4213095 | 10/1993 | Germany . |
| 4424139 | 3/1995 | Germany . |

OTHER PUBLICATIONS

"First Demonstration of Multihop All–Optical Packet Switching", D. Blumenthal et al, *IEEE Photonics Technology Letters*, vol. 6, No. 3, Mar. 1984, pp. 457–460.

"Wavelength Converter Based on Integrated All–Active Three–Port Mach–Zehnder Interferometer", M. Schilling et al, *Electronics Letters*, vol. 30, No. 25, Dec. 8, 1994, pp. 2128–2130.

"All–Optical Address Recognition and Self–Routing in a 250 G–bit/s Packet–Switched Network", I Glesk et al, *Electronics Letters*, vol. 30, No. 16, Aug. 4, 1994, pp. 1322–1323.

"Integrated Interferometric Injection Laser: Novel Fast and Broad–Band Tunable Monolithic Light Source", M. Schilling et al, *IEEE Journal of Quantum Electronics*, vol. 27, No. 6, Jun. 1991, pp. 1616–1622.

Patent Abstracts of Japan 2–67525 (A) Mar. 7, 1990 and Japanese Patent Application No. 63–218305 Sep. 2, 1988.

A. Dörnen et al, "Halbleiter fur die Optoelektronik und Photonik", Verlag Hansel–Hohenhausen, 1994, Egelsbach/Frankfurt/Washington, pp. 342–348.

E. Kneubühl et al, "Laser", *Teubner Study Books*, Dec. 1991, pp. 213–215.

*Primary Examiner*—Leslie Pascal
*Attorney, Agent, or Firm*—Ware, Fressola, Van Der Sluys & Adolphson LLP

[57] ABSTRACT

The invention concerns an optically controlled optical switching module (SM1), as well as a method of optically controlling an optical switching network, and an optical switching network. The optical switching module (SM1) is equipped with at least one optical switch (OCOSW), which is controlled through an optical control input (CONTR), which switches a useful optical signal. The optical switching module (SM1) furthermore has an optical pulse shaper (PW) that is connected to this control input (CONTR), which produces switching pulses that are suitable for the optical switch (OCOSW), from an optical control signal. The optical switching network contains at least one optical switching module (SM1). Control bits from an optical data packet are individually masked out in the optical switching network by means of optical switches (OSW), and the optical control signals corresponding to the respective control bits (CB1 to CB4) are fed to one of the optical pulse shapers (PW).

10 Claims, 4 Drawing Sheets

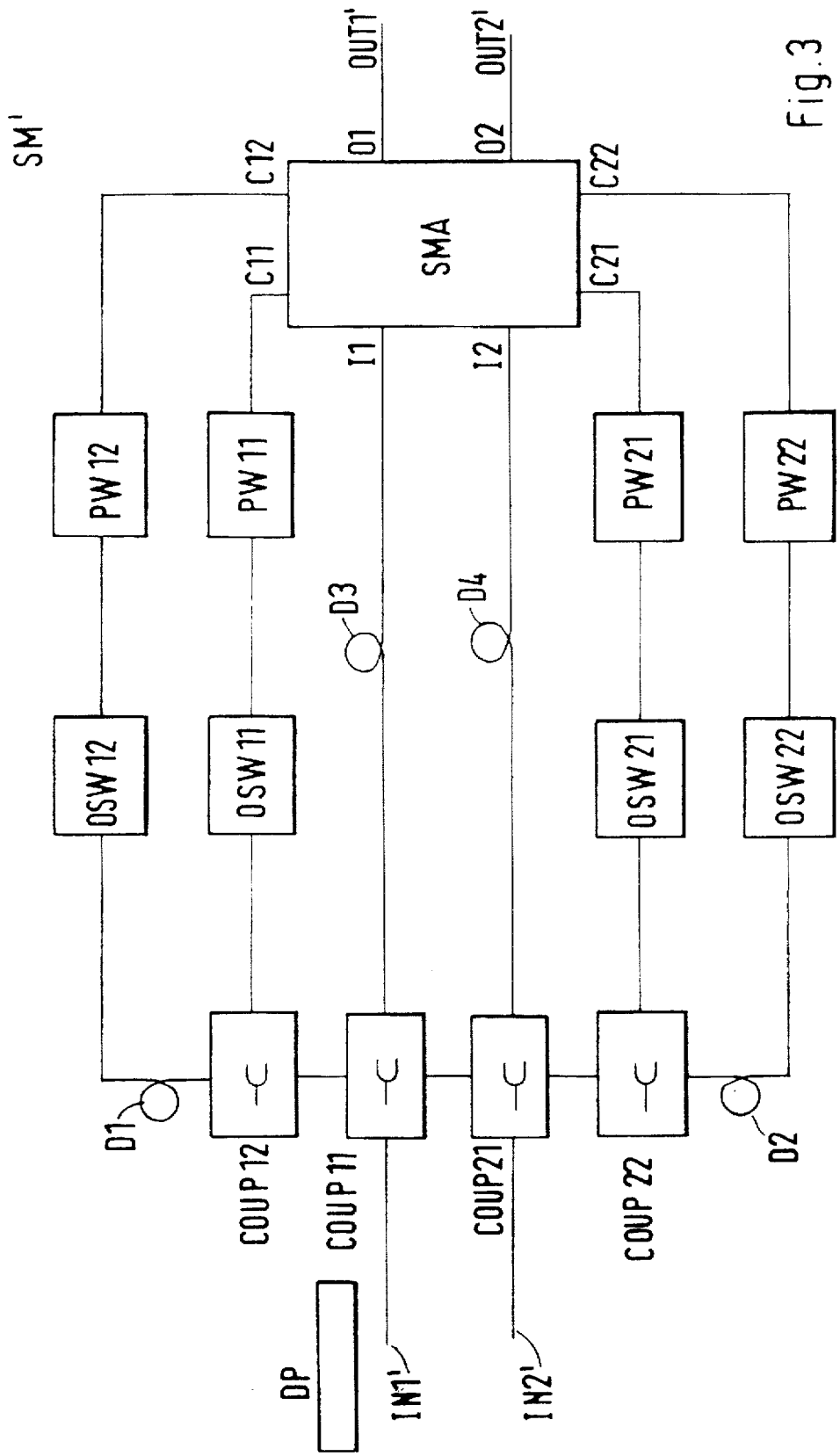

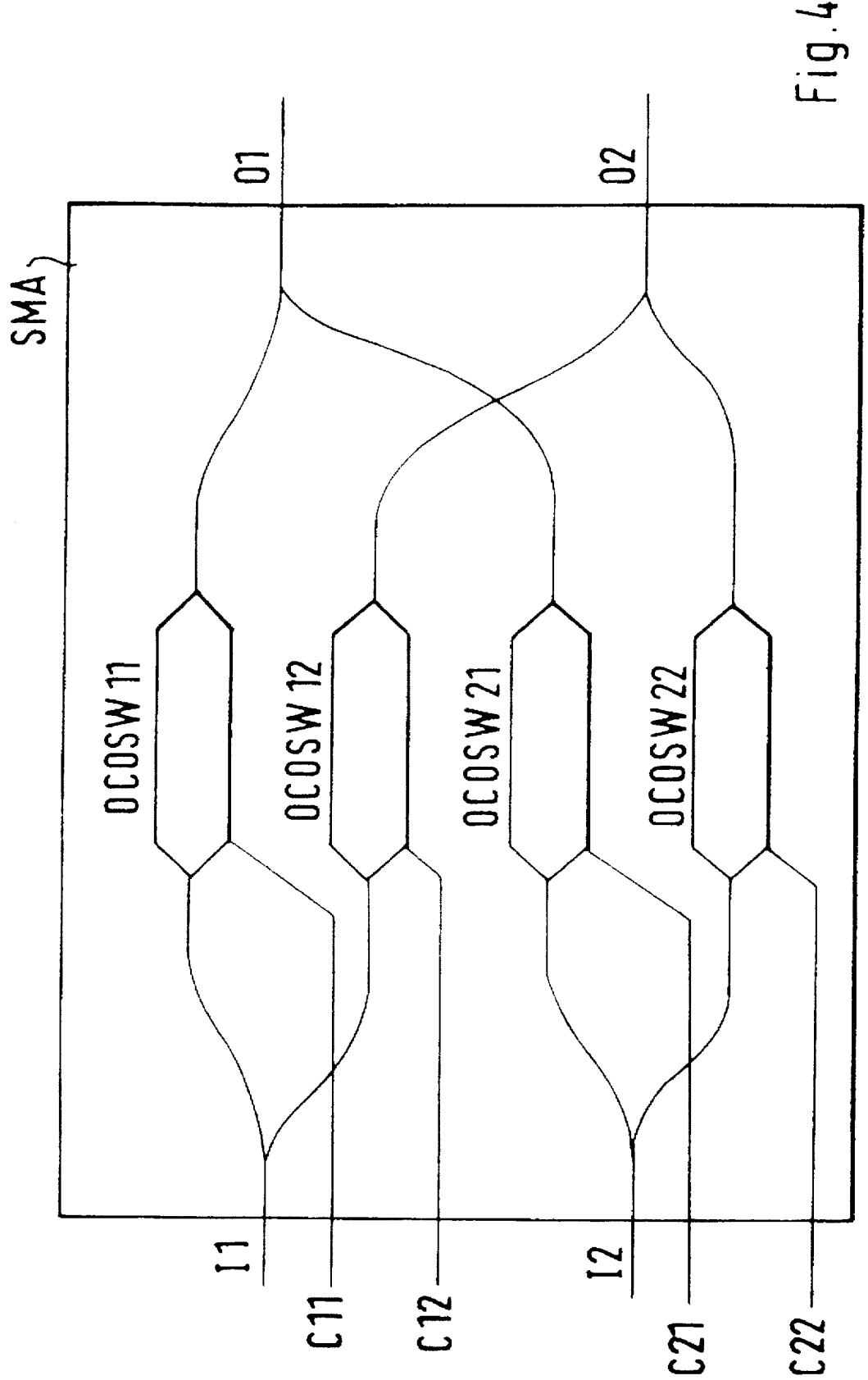

OPTICALLY CONTROLLED OPTICAL SWITCHING MODULE, METHOD OF OPTICALLY CONTROLLING AN OPTICAL SWITCHING NETWORK, AND OPTICAL SWITCHING NETWORK

TECHNICAL FIELD

The invention concerns an optically controlled switching module, a method of optically controlling an optical switching network, and an optical switching network.

BACKGROUND OF THE INVENTION

In broad-band communication networks, data are increasingly transmitted through glass or optical fiber lines in the form of optical signals. However, because of technical difficulties, electrical switching networks with electrical switching points are still used to switch data, which causes speed drawbacks and requires additional effort to convert from optical into electrical signals.

The invention starts with an optical switching network, which is also optically controlled and thus represents a closed optical solution. For example, such an optical switching network is described in the U.S. Pat. No. 4,894,818.

This optical switching network is designed to switch data packets and comprises a number of optically controlled optical switching modules. The control information for the individual optical switching modules is always supplied in the form of control pulses on a different wavelength than that of the data packets, in parallel thereto.

In particular, such an optical switching module contains a nonlinear optical mirror, an optical wavelength filter and an optical amplifier. The nonlinear optical mirror has the property of locally reflecting a high-intensity incoming light beam, and thus to guide it to a first output, and not to reflect a low-intensity light beam, and thus to guide it to a second output. It consists of a semiconductor crystal with a large nonlinear constant, for example ZnO. The control signal is coupled out before the nonlinear optical mirror by means of the optical wavelength filter, its intensity is increased by the optical amplifier and the control signal is then coupled back in. In this way the data packet is switched to the first output if a control pulse is present, and to the second output if no control pulse is present.

The construction of an optical switching network with such optical switching modules has the disadvantage that a large number of wavelengths is occupied for controlling the switching network, and these wavelengths can no longer be used for the transmission of further data packets by means of a wavelength multiplex. The construction of a switching network that does not depend on wavelengths is therefore made more difficult. There are additional synchronism problems, because the running times of light signals differ as a function of their wavelengths.

Furthermore, optical switching modules are known, whose control is not achieved by optical but by electrical means. These switching modules are mostly constructed of electrically controlled optical 2×2 switches based on LiNbO$_3$.

An example of such a switching module is described in the article "First Demonstration of Multihop All-Optical Packet Switching" by D. J. Blumenthal et al, IEEE Photonics Technology Letters, March 1994.

This switching module comprises such an electrically controlled optical 2×2 switch and an expensive electrical control installation to control this switch. In this case as well, the control signals are supplied on a different wavelength than that of the data packet being switched.

Another example of such a switching module is described in the article "All-optical address recognition and self-routing in a 250 Gbit/s packet switched network" by I. Glesk et al, from the Aug. 4, 1994 Electronics Letters magazine, Vol. 30, No. 16.

This switching module switches optical data packets which contain a packet header with several control bits and a high-intensity clock bit. In the switching module, this clock bit is correlated with a previously determined control bit by means of an optical delay line, the optical correlation signal is converted into an electrical signal and fed to an electrical pulse generator, which switches the optical 2×2 switch.

However, such optical switching modules have the disadvantage that an electrical system must be supported in addition to the optical system, and that converters are needed to convert the optical control signals into electrical control signals. Furthermore, because of the electrical control, speeds that are not as high as with a purely optical solution are attained.

DISCLOSURE OF INVENTION

The invention has the task of enabling the switching of data streams that are available in optical form, without converting optical into electrical signals, if possible.

According to a first aspect of the present invention, an optically-controlled optical switching module is characterized in that the optical switching module comprises at least one optical switch for switching an optical intelligence signal, said optical switch being controllable via an optical control input, and an optical pulse shaper connected to said control input for providing switching pulses for the optical switch from an optical control signal. The optical switch can be a Mach-Zehnder interferometer. The pulse shaper can be a laser with a saturable absorber.

In further accord with this first aspect of the present invention, the switching module may comprise a further optical switch for masking control bits out of the intelligence signal, which comprises a sequence of data packets, wherein the further optical switch is connected to the pulse shaper for feeding the masked-out control bits as control signals thereto.

According to a second aspect of the present invention, a method of optically controlling an optical switching network which serves to switch optical data packets is characterized in that control bits of an optical data packet are individually optically masked out by means of optical switches, that optical control signals corresponding to the respective control bits are fed to respective optical pulse shapers for providing optical switching pulses therefrom, and that the optical switching pulses are each for controlling at least one optical switch for switching the data packet. The control bits may be present in serial form and converted to parallel form by means of optical delay elements before being fed to the optical pulse shapers. The optical switching network may be constructed from a plurality of optical switching modules, each for masking only a single control bit out of the data packet.

According to a third aspect of the present invention, an optical switching network comprises a plurality of optically-interconnected and optically-controlled optical switching modules, each characterized in that the optical switching module comprises at least one optical switch for switching an optical intelligence signal, said optical switch being controllable via an optical control input, and an optical pulse shaper connected to said control input for providing switching pulses for the optical switch from an optical control signal.

The basic idea of the invention is to construct an optical switching module with optically controlled optical switches, which are controlled by an optical pulse shaper through an optical control input. By means of this pulse shaper, an optical control pulse is produced from an optical control signal, which pulse is adapted to the switching behavior of the optical switch and to the structure of the optical data streams being switched, and surely operates the optical switch and couples it out of a previous optical evaluation of the control signal. This combination is advantageously suitable as a basic structure, which can be integrated into the construction of optically controlled switching networks of any size.

It is particularly advantageous to construct the optically controlled optical switch with a Mach-Zehnder interferometer. This structural element is used to build optical wavelength converters and offers the particular advantage that it allows space switching at high switching speed which is not dependent on wavelengths.

Another advantage is to use such basic structures for the switching of optical data packets, which have a packet header and whose path through a switching network is determined by control bits in the packet header. In this case the optical evaluation of this control information can consist solely of the optical masking of the individual control bits, which are then directly fed as control signals to the optical pulse shapers. In this way it is possible to construct optical switching networks of any size, which operate at a high switching speed, at a low cost for the structural elements.

These and other objects, features and advantages of the present invention will become more apparent in light of the detailed description of a best mode embodiment thereof, as illustrated in the accompanying drawing.

BRIEF DESCRIPTION OF THE DRAWING

FIG. 3 is a block circuit diagram of a switching module according to the invention for a second configuration example.

FIG. 4 is a block circuit diagram of a switching matrix for the switching module in FIG. 3.

BEST MODE FOR CARRYING OUT THE INVENTION

The first configuration example describes the construction of a switching network according to the invention, made up of several switching modules according to the invention, which are optically controlled by a method according to the invention.

Figure 1:
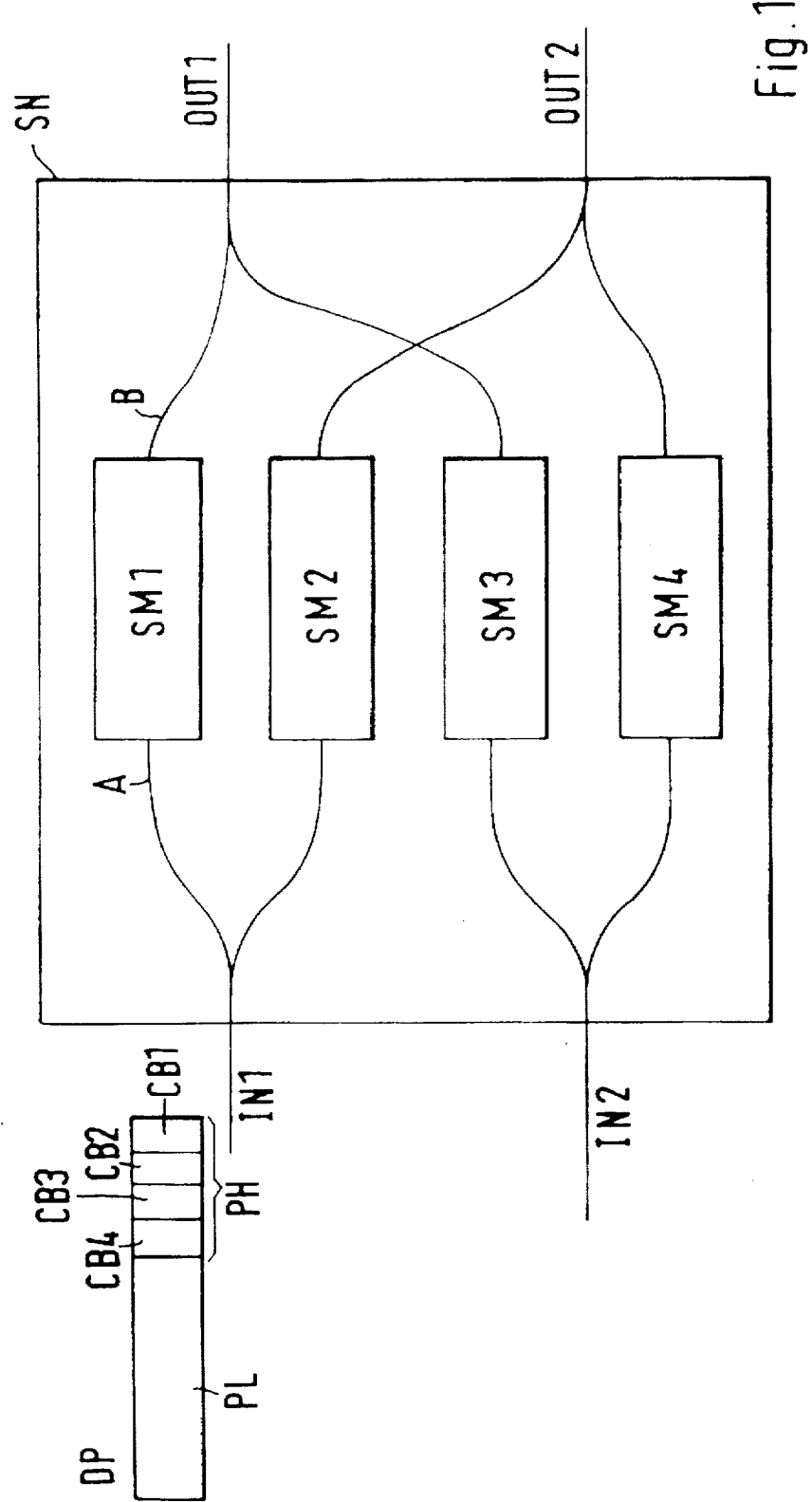
FIG. 1 is a block circuit diagram of a switching network according to the invention for a first configuration example.

FIG. 1 illustrates an optical switching network SN with two optical inputs IN1 and IN2 and two optical outputs OUT1 and OUT2, as well as a data packet DP which arrives at input IN1.

The optical switching network SN is used to switch data packets arriving at one of the optical inputs IN1 and IN2. It contains four optical switching modules SM1 to SM4, of which an input A and an output B are available to the optical switching network SN. Input IN1 is connected to output OUT1 via the optical switching module SM1, and to output OUT2 via the optical switching module SM2. In addition, input IN2 is connected to output OUT1 via the optical switching module SM3, and to output OUT2 via the optical switching module SM4.

The optical switching modules SM1 to SM4 are of equal construction and, based on the control information carried by a data packet, switch this data packet through to one of outputs OUT1 or OUT2, or they block it. The evaluation of the control information and the switching of the data packet are hereby achieved in a purely optical manner.

Constant length data packets arrive at the optical switching network SN, where the possible arrival times of the data packets correspond to a predetermined frame pulse. This frame pulse is designed so that a pulse period is longer than the duration of one data packet, and in that way a safety time interval, also called guard band, is located between two directly consecutive data packets.

The construction of such a data packet will now be explained by means of data packet DP. The data packet DP is switched in the form of digital signals. It comprises a useful part PL and a packet header PH, which contains four control bits CB1 to CB4.

The useful data carried by the data packet DP are transported in the useful part PL. In this case the useful part has a length of 48 bytes, for example. However, it is also advantageous to use very large data packets, with a length of 20,000 bits for example.

The packet header PH is used to switch the data packet DP through the optical switching network SN. Its first two control bits CB1 and CB2 identify the one of the two outputs OUT1 and OUT2 of the optical switching network SN to which the data packet DP is to be fed. The remaining two control bits CB3 and CB4 identify the output of another switching network not illustrated here, which serves to switch the data packet DP further.

It is also possible for the packet header PH to transport a different number of control bits. For example, if several switching networks, which correspond to the switching network SN, are connected in series, two control bits are required for each of these switching networks.

It is also possible to use other coding patterns for the route search through several of such series-connected switching networks, where the patterns for example evaluate a predetermined control bit in several switching networks.

The data packet DP arriving at the optical input IN1 is routed to both the optical switching module SM1 and to the optical switching module SM2. The optical switching modules SM1 and SM2 now evaluate the control bit CB1 or CB2, and direct the data packet DP to the optical output OUT1 or OUT2 if the control bit CB1 or CB2 is set. Otherwise they block the data packet DP. The same applies respectively to a data packet DP arriving at the optical input IN2, i.e. the data packet is routed to the output OUT1 if the control bit of this data packet is set to correspond to control bit CB1, and it is routed to output OUT2 if the control bit is set to correspond to control bit CB2. Thus, a data packet arriving at one of the optical inputs IN1 or IN2 is routed to optical output OUT1 if the control bit corresponding to control bit CB1 is set, and to optical output OUT2 if the control bit corresponding to control bit CB2 is set, and to both outputs OUT1 and OUT2 if both of these control bits are set, and is copied in this manner.

It is possible to use the optical switching network SN as the basic switching element for the construction of optical switching networks of any size. The structure of such switching networks could for example correspond to Banyan networks, to Butcher-Banyan networks or also to networks with a preceding sorting network or a rear feed. The use of such sorting networks in particular can ensure that no blockages can occur within the basic switching elements that correspond to the switching network SN.

It is also possible for the switching network SN to have a different structure, and to have a different number of optical inputs and outputs. When such switching networks are constructed, an optical switching module corresponding to optical switching modules SM1 to SM4 would be switched between each of the inputs and outputs. For n inputs and m outputs this would require n×m optical switching modules. The packet header of data packets arriving at such an optical switching network would have to contain at least m control bits, one for each output. In this way, the optical switching module connected to the first output would for example send one data packet to this optical output if the first control bit of the packet header was set, and to the switching module connected to the second output, if the second control bit of the packet header was set, etc.

The exact construction of switching modules SM1 to SM4 will now be explained by means of the construction example of the optical switching module SM1.

Figure 2:
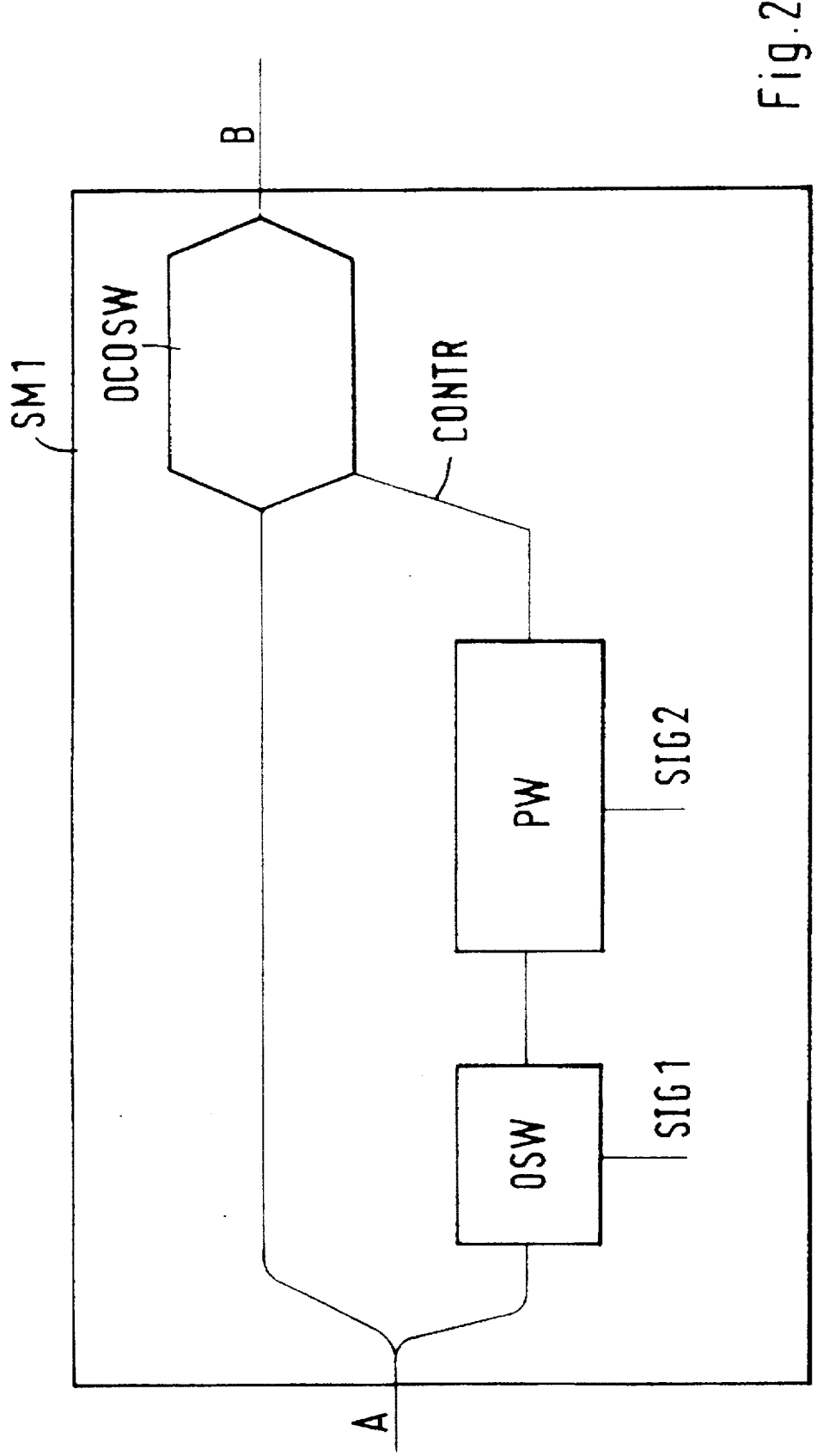
FIG. 2 is a block circuit diagram of a switching module according to the invention for the switching network in FIG. 1.

FIG. 2 illustrates the optical switching module SM1 with optical input A and optical output B. The optical switching module SM1 comprises an optical switch OSW, an optical pulse shaper PW and an optically controlled optical switch OCOSW with an optical control input CONTR. An optical conductor connects optical input A to optical switch OCOSW, which in turn is connected by an optical conductor to the optical pulse shaper PW, which in turn is connected by an optical conductor to the optical control input CONTR. A clock signal SIG1 is applied to optical switch OSW, and a clock signal SIG2 is applied to the optical pulse shaper.

The optically controlled optical switch OCOSW may be a Mach-Zehnder interferometer. Such uses different propagation speeds to obtain a phase shift of the carrier wavelengths for the controlled extraction of a signal. Since the propagation speeds depend on the index of refraction of the transmission medium, and the latter depends on the radiated light intensity, the desired phase shift can be achieved by coupling in a light pulse with a defined intensity through the control input CONTR. The result is the possibility of obtaining an optically controlled optical switch by means of such a Mach-Zehnder interferometer.

The construction of a Mach-Zehnder interferometer that is suitable for the optical switch OCOSW can correspond, for example, to the construction of a so-called "three-port MZI" Mach-Zehnder interferometer, described in the article "Wavelength converter based on integrated all-active three-port Mach-Zehnder interferometer", by M. Schilling, pages 2118 to 2129 of the Dec. 8, 1994 "Electronics Letters" magazine, Vol. 30, No. 25. The Mach-Zehnder interferometer described therein is used as an optical wavelength converter.

To use it as an optical switch, the control signal replaces the signal with the wavelength to be converted. Instead of a Mach-Zehnder interferometer, it is also possible to use other optically controlled optical switches. Such switches could be nonlinear optical mirrors or saturable absorbers, for example.

The optical pulse shaper PW is a laser with a saturable absorber. The exact construction of such a laser is described for example in the book "Laser", by F. K. Kneubühl and M. G. Sigrist, which appeared in the 1991 series of Teubner Study Books.

In such a laser with a saturable absorber, an absorber is built into the laser resonator, which hinders the light emission of the laser when it is ready to operate. The laser begins to radiate if a saturation takes place with a light pulse supplied from the outside. The energy needed for this light pulse can be kept quite small if the absorber is located appropriately in the resonator, thereby utilizing the amplification of the light pulse in the laser. If the laser has begun to radiate, sufficient light energy is released to keep the absorber saturated further. The laser continues to emit a light beam until it is shut off. In this case, the laser shut-off is controlled by the clock signal SIG2.

It is also possible not to let the clock signal SIG2 determine the time period during which the laser radiates, but rather have the laser itself end the light emission after a predetermined time. This effect can be achieved by selecting the absorption material in a way so that, after a first emission which is between a microsecond and a picosecond, the energy remaining in the laser is no longer sufficient for further emissions. Reference is made to the above-cited book for the selection of suitable absorbers.

It is also possible to construct the optical pulse shaper PW with an optical flip-flop. Such an optical flip-flop could by built with a Mach-Zehnder interferometer, for example. The switching of the Mach-Zehnder interferometer would correspond to the construction of an electrical flip-flop. The construction of such an optical flip-flop with electrically controlled switches, such as for example Y-lasers, would be possible.

The optical switch OSW is an optical switch that is controlled by the electric signal SIG1. This optical switch is a semiconductor optical amplifier (SOA). However, it is also possible to use a Mach-Zehnder interferometer with an electrical control input, or an electro-absorption modulator, instead of a semiconductor optical amplifier. These structural elements are described for example in the chapter "14.5 optoelectronic structural elements for optical switching technology", pages 342 to 348 in the book "Semiconductors for Optoelectronics and Photonics" by A. Dörnen et al, published in 1994 by Dr. Markus Hensel-Hohenhausen.

The data packet DP arriving at the optical input A is processed by the optical switching element SM1 as follows: The data packet DP is fed from the optical input A to the optical switch OCOSW via an optical waveguide. A portion of the light is coupled out of this optical conductor and in this way a copy of the data packet DP is fed to the optical switch OSW. The optical switch OSW is controlled by the electric signal SIG1 in a way so that it steers the incoming light beam to the optical pulse shaper PW precisely during the time period that corresponds to the control bit CB1, and blocks the light beam during the remaining time. In this way the optical switch OSW masks the control bit CB1 out of the packet header PH of the arriving data packet DP.

If the control bit CB1 is set, the optical pulse shaper PW receives a short light pulse, which is converted by the latter into an optical control pulse of longer duration. By contrast, if the control bit CB1 is not set, no light pulse is sent to the optical pulse shaper PW and the latter does not produce any optical control pulse.

In this case the laser with saturable absorber, which forms the optical pulse shaper PW, is designed so that the energy of the set and coupled-out control bit CB1 is sufficient to ignite the laser. In this case it is also possible to increase the energy of the light pulse arriving at the laser with saturable absorber in a way, whereby a larger portion of the signal energy is coupled out to the branch with the optical switch OSW and the optical pulse shaper PW.

The laser with saturable absorber is furthermore designed so that the energy of the released control pulse is sufficient to switch the Mach-Zehnder interferometer.

The duration of the control pulse is determined by the electric clock signal SIG2. This duration is chosen so that it lies between the duration of the clock period of the frame pulse and a duration that corresponds to the length of the data packet DP.

A pulse generator supplies the clock signals SIG1 and SIG2 as follows: the clock signal SIG1 is made up of clock pulses whose widths correspond to the duration of the control bit CB1 and which are set once within the frame pulse to a point in time at which the control bit CB1 should arrive at the optical switch OSW. The clock signal SIG2 is made up of clock pulses which, at the end of a frame pulse, switch off the laser that forms the pulse shaper PW.

It is also possible for the clock signals SIG1 and SIG2 to be supplied as optical clock signals. In that case the optical switch OSW would also be made up of a Mach-Zehnder interferometer, for example. It is furthermore possible to omit the clock signal SIG2, if the laser with saturable absorber is designed so that it only radiates during the time period which corresponds to the length of the data packet DP.

It is furthermore also possible for the pulse generator to produce the clock signals for the switching modules SM2 to SM4, which correspond to the clock signals SIG1 and SIG2, in addition to these clock signals. In that case, the clock signals would always be delayed with respect to each other in accordance with the evaluated control bits. If the control bit CB1 is set, the optically controlled optical switch OCOSW receives an optical control pulse of a duration that corresponds at least to the duration of the data packet DP. In this way the optical switch OCOSW becomes transmissive for this period of time and the data packet DP is then fed to the optical output B.

It is also possible to construct the optically controlled optical switch OCOSW in a way so that it blocks when an optical control pulse is present, and becomes transmissive when no such optical control pulse is present. This would achieve a contrasting switching behavior, i.e. making available a switching module that is the inverse of the above switching module, and only feeds a data packet if a control bit was not set.

Such a behavior of the optically controlled optical switch OCOSW can be achieved with a Mach-Zehnder interferometer, by an accordingly different adjustment of the operating point, by changing the current values in the parallel arms of the Mach-Zehnder interferometer.

It is possible and could be advantageous to construct optical switching networks with the optical switching modules that correspond to optical switching modules SM1 to SM4, and by means of such inverse optical switching modules. It is furthermore possible to insert an optical delay line into the optical path between the optical input A and the optical switch OCOSW, which delays the data packet DP for the period of time required by the optical switch OSW and the optical pulse shaper PW to produce the control pulse. Because of the rapid switching characteristics of the structural elements used here, inserting such a delay line should not be necessary as a rule.

It is furthermore possible to design the switching module SM1 to switch data packets, whose potential arrival times do not correspond to a predetermined frame pulse, and which do not all have the same length. The control signal for the optical pulse shaper PW can be produced by correlating a carried-along clock pulse, or a carried-along synchronizing bit sequence, with a special control bit inside the packet header. In this case the optical signal corresponding to the correlation result would be used as a control signal. Such methods could also be used to evaluate the control information for the switching module SM1 in FIG. 2.

A second configuration example illustrates another possibility for the construction of an optical switching module according to the invention. To implant such a switching module into a switching network, what was said for the implantation of the switching network SN into a superordinate switching network in accordance with FIG. 1 applies here accordingly.

FIG. 3 illustrates an optical switching module with two optical inputs IN1' and IN2', two optical outputs OUT1' and OUT2', four optical couplers COUP11 to COUP22, four optical switches OSW11 to OSW22, four optical pulse shapers PW11 to PW22, four optical delay units D1 to D4 and one optical switching matrix SMA. The optical switches OSW11 to OSW22 are controlled by a clock signal SIG1' (not shown). The optical pulse shapers PW11 to PW22 are controlled by a clock signal SIG2' (not shown). The data packet DP arrives at optical input IN1'. The optical switching matrix SMA has two inputs I1 and I2, two outputs O1 and O2, and four control inputs C11 to C22.

The optical inputs IN1' and IN2' are connected to inputs I1 or I2 through the couplers COUP11 and COUP21 and through the optical delay units D3 or D4. Couplers COUP11 and COUP21 are connected to couplers COUP12 or COUP22. The control inputs C11 and C21 are connected to couplers COUP12 or COUP22 through the optical pulse shapers PW11 or PW21 and through the optical switches OSW11 or OSW21. The control inputs C12 and C22 are connected to couplers COUP12 or COUP22 through the optical pulse shapers PW12 or PW22, through the optical switches OSW12 or OSW22 and through the optical delay units D1 or D2. The outputs O1 and O2 are connected to outputs OUT1' and OUT2'.

The optical switches OSW11 to OSW22 and the optical pulse shapers PW11 to PW22 are constructed like the optical switch OSW or the optical pulse shaper PW in FIG. 2. What was said regarding the clock signals SIG1 or SIG2 in FIG. 2 applies equally to the clock signals SIG1' and SIG2'.

The optical couplers COUP11 to COUP22 are conventional optical couplers which allocate a light beam conducted in one fiber to two fibers.

The optical delay units D1 to D4 are conventional optical delay units, for example fiber loops. Delay units D1 and D2 delay an incoming light beam for a time interval which corresponds to the duration of a control bit. Delay units D3 and D4 delay an incoming light beam for a time interval that is needed to evaluate the packet header.

On the one hand, the data packet DP arriving at the optical input IN1' is delayed by the optical delay element D3 and fed to input I1, and on the other to both optical switches OSW11 and OSW12. In this case, the data packet DP is delayed by the duration of one control bit and fed to optical switch OSW12, as opposed to optical switch OSW11. This delay is achieved by the delay unit D1. For example, the control bit CB1 then arrives at optical switch OSW12 at the same time as control bit CB2 arrives at optical switch OSW11. In this way, the data packet DP located in serial form at the optical input IN1' is paralleled by this delaying arrangement.

Both optical switches OSW11 and OSW12 are controlled by the clock signal SIG1' in such a way, that at the point in time at which the control bits CB1 and CB2 are usually present at optical switches OSW12 or OSW11, the latter allow these existing light beams to pass, but otherwise block these light beams.

The optical pulse shapers PW11 and PW12 are simultaneously controlled by the clock signal SIG2'. The selection of the clock signals SIG1' and SIG21' is made in the same sense as the relationship of clock signals SIG1 and SIG2. Thus, if the control bit CB1 is set, the optical pulse shaper PW12 produces a control bit of a duration that corresponds to the length of the data packet DP. If control bit CB2 is set at the same time, the optical pulse shaper PW11 produces the same pulse at the same point in time.

If an optical data packet arrives at input IN2', it is processed by the optical switches OSW21 and OSW22, and by the optical pulse shapers PW21 and PW22, in an analogous manner as the data packet DP.

FIG. 4 illustrates the optical switching matrix SMA with the two inputs I1 and I2, the two outputs O1 and O2, and the four control inputs C11 to C22. The switching matrix SMA has four optically controlled switches OCOSW11 to OCOSW22. The input I1 is connected to output O1 through the optical switch OCOSW11, and to output O2 through the optical switch OCOSW12. The input I2 is connected to output O1 through the optical switch OCOSW21, and to output O2 through the optical switch OCOSW22. The optical switches OCOSW11 are connected to control inputs C11, C12, C21 or C22.

The optically controlled switches OCOSW11 to OCOSW22 are constructed like the optically controlled switch OCOSW in FIG. 2, while the control inputs C11 to C12 correspond to the optical control input CONTR of optical switch OCOSW.

If the control bit that corresponds to control bit CB1 is set in a data packet, it is fed to the output O1 by the optical switch OCOSW11 if it arrived at input I1, or by optical switch OCOSW21 if it arrived at input I2. The same applies to optical switches OCOSW12 and OCOSW22 if the control bit that corresponds to control bit CB2 is set in an incoming data packet.

It is possible to construct the switching module in FIG. 3 with any number of n inputs and any number of m outputs. Each input is provided with a circuit which corresponds to the circuit module formed by couplers COUP11 and COUP12, the delay units D1 and D3, the optical switches OSW12, OSW11, OCOSW11 and OCOSW12, and by the pulse shapers PW11 and PW12. For each increase in the number of outputs, an additional circuit branch is inserted into this circuit module, comprising a coupler, a delay unit, an optical switch, an optical pulse shaper and an optically controlled pulse shaper and an optically controlled optical switch. Analogously to FIG. 3, this circuit branch would then be switched between the delay unit D1 and the optical switch OSW12 by its coupler. What was said for the expansion of the switching network according to FIG. 1 also applies to the necessary modification of the structure of switching matrix SMA.

It is furthermore possible to use a switching matrix with a different structure than that of switching matrix SMA. It would then be particularly possible to successively switch several stages of optically controlled optical switches. Each control bit could then control several of such optically controlled optical switches, so that any desired coding forms are possible for that output of the switching matrix to which a data packet is to be transported. Such coding forms could particularly reduce the number of required control bits.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. An optically controlled optical switching module (SM1 to SM4; SM'), wherein the optical switching module (SM1 to SM4; SM') comprises at least one optical switch (OCOSW; OCOSW11 to OCOSW22) for switching an optical intelligence signal, said optical switch being controllable via an optical control input (CONTR), and an optical pulse shaper (PW; PW11 to PW22) connected to said control input (CONTR) for providing switching pulses for the at least one optical switch (OCOSW; OCOSW11 to OCOSW22) from an optical control signal, characterized in that the pulse shaper (PW; PW11 to PW22) is a laser with saturable absorber.

2. An optically controlled optical switching module as claimed in claim 1, characterized in that the optical switch (OCOSW; OCOSW11 to OCOSW22) is a Mach-Zehnder interferometer.

3. An optically controlled optical switching module (SM1 to SM4; SM'), wherein the optical switching module comprises at least one optical switch (OCOSW; OCOSW11 to OCOSW22) for switching an optical intelligence signal, said optical switch being controllable via an optical control input (CONTR), and an optical pulse shaper (PW; PW11 to PW22) connected to said control unit (CONTR) for providing switching pulses for the at least one optical switch (OCOSW; OCOSW11 to OCOSW22) from an optical control signal, characterized in that the switching module (SM1 to SM4; SM') comprises a further optical switch (OSW; OSW 11 to OSW22) for masking control bits (CB1 to CB4) out of the intelligence signal, which comprises a sequence of data packets (DP), and that the further optical switch (OSW; OSW11 to OSW22) is connected to the optical pulse shaper (PW; PW11 to PW22) for providing the masked-out control bits (CB1 to CB4) as control signals thereto.

4. An optically controlled optical switching module as claimed in claim 3, characterized in that the pulse shaper (PW; PW11 to PW22) is a laser with saturable absorber.

5. A method of optically controlling an optical switching network (SN) which serves to switch optical data packets (DP), characterized in that control bits (CB1 to CB4) of an optical data packet (DP) are individually optically masked out by means of optical switches (OSW; OSW11 to OSW22), that optical control signals corresponding to the respective control bits (CB1 to CB4) are provided to respective optical pulse shapers (PW; PW11 to PW22) which in response thereto provide optical switching pulses therefrom, and that the optical switching pulses each control at least one optical switch (OCOSW; OCOSW11 to OCOSW22) which serves to switch the data packet (DP).

6. A method as claimed in claim 5, characterized in that the control bits (CB1 to CB4), which are present in serial form, are converted to parallel form by means of optical delay elements (D1, D2) before being provided to the optical pulse shapers (PW11 to PW22).

7. A method as claimed in claim 5, characterized in that the optical switching network (SN) is constructed from a plurality of optical switching modules (SM1 to SM4) which each mask only a single control bit (CB1 to CB4) out of the data packet (DP).

8. An optical switching network (SN) comprising at least one optically controlled optical switching module (SM1 to SM4; SM'), wherein the optical switching module (SM1 to SM4; SM')comprises at least one optical switch (OCOSW; OCOSW11 to OCOSW22) for switching an optical intelligence signal, said optical switch being controllable via an optical control input (CONTR), and an optical pulse shaper (PW; PW11 to PW22) connected to said control unit (CONTR) for providing switching pulses for the at least one optical switch (OCOSW; OCOSW11 to OCOSW22) from an optical control signal, characterized in that the pulse shaper (PW; PW11 to PW22) is a laser with saturable absorber.

9. An optical switching network (SN) comprising at least one optically controlled optical switching module (SM1 to SM4; SM'), wherein each optical switching module (SM1 to SM4; SM') comprises at least one optical switch (OCOSW; OCOSW11 to OCOSW22) for switching an optical intelligence signal, said optical switch being controllable via an optical control input (CONTR), and an optical pulse shaper (PW; PW11 to PW22) connected to said control input (CONTR) for providing switching pulses for the at least one optical switch (OCOSW; OCOSW11 to OCOSW22) from an optical control signal, characterized in that the switching module (SM1 to SM4; SM') comprises a further optical switch (OSW; OSW11 to OSW22) for masking control bits (CB1 to CB2) out of the intelligence signal, which comprises a sequence of data packets (DP), and that the further optical switch (OSW; OSW11 to OSW22) is connected to the optical pulse shaper (PW; PW11 to PW22) for providing the masked-out control bits (CB1 to CB4) as control signals thereto.

10. An optical switching network (SN) as claimed in claim 9, characterized in that the pulse shaper (PW; PW11 to PW22) is a laser with saturable absorber.

* * * * *